UNITED STATES PATENT OFFICE.

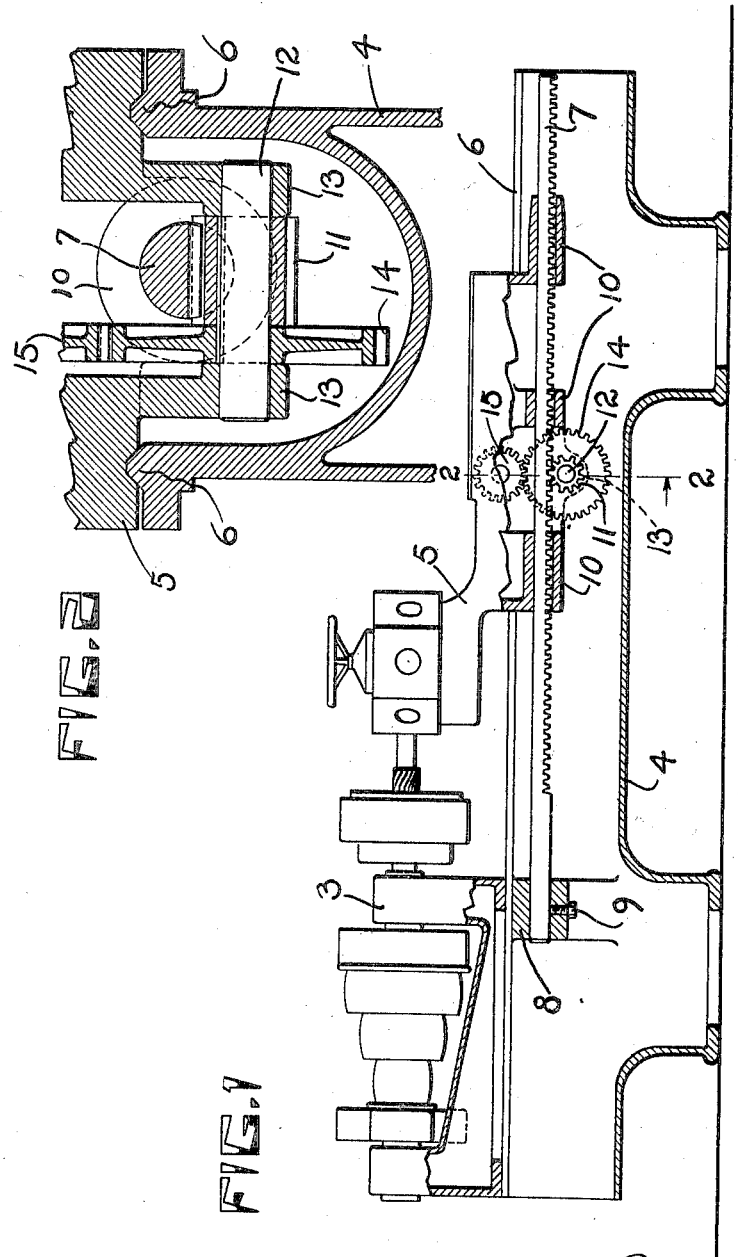

RICHARD K. LE BLOND AND WILLIAM F. GROENE, OF CINCINNATI, OHIO, ASSIGNORS TO THE R. K. LE BLOND MACHINE TOOL COMPANY, OF CINCINNATI, OHIO, A CORPORATION OF OHIO.

ACTUATING MECHANISM FOR LATHES.

1,067,260. Specification of Letters Patent. Patented July 15, 1913.

Application filed April 6, 1912. Serial No. 689,016.

*To all whom it may concern:*

Be it known that we, RICHARD K. LE BLOND and WILLIAM F. GROENE, citizens of the United States of America, and residents of Cincinnati, county of Hamilton, and State of Ohio, have invented certain new and useful Improvements in Actuating Mechanisms for Lathes, of which the following is a specification.

This invention relates to lathes and has for an object to produce a lathe having improved means for actuating the tool-stock or tool-carrying turret which overcomes difficulties ordinarily encountered in lathes, and insures greater safety to the operator. This and other objects we attain in a lathe embodying the features herein illustrated and described.

In the drawings accompanying and forming a part of this application, Figure 1 is a somewhat diagrammatical vertical sectional view of a lathe embodying our invention, portions being shown in section for convenience of illustration. Fig. 2 is a fragmental sectional view along the line 2—2 of Fig. 1.

The lathe illustrated as an embodiment of our invention includes the usual head-stock 3, the usual bed 4, and a tool-carrying turret 5, which is capable of moving along ways 6 provided for it on the bed.

One of the principal features of our invention is a rack 7, forming a part of the turret actuating mechanism and its arrangement and location with respect to the bed 4 and the turret 5. As illustrated, the rack 7 is semi-cylindrical, is provided with teeth on its lower and flat face only, extends along the bed 4 midway between the ways 6 and is secured to the head-stock end of the bed only. Any suitable means may be employed for securing the rack to the bed, and in the lathe illustrated we have provided a boss 8 on the bed having a horizontal and longitudinally extending bore through which the end of the rack projects and to which it is secured by means of a set-screw 9. The rack projects parallel with the ways 6 but is located a little below them and the turret body is provided with downwardly projecting supports or guides 10, through which the rack extends and in which it is supported. In the lathe illustrated we have provided three guides 10 which are located at substantially equal distances apart and so arranged that they form an adequate support for the rack. We have also located a rack-engaging pinion 11 below the rack so that it meshes with its teeth at a point substantially midway between two of the guides 10. The three guides insure a correct alinement of the rack and prevent deflection at the point of engagement of the pinion and therefore hold it in the proper position with relation to the pinion. The pinion 11, is mounted on a short shaft 12 the ends of which are journaled in depending lugs 13 formed on the body of the turret and extending below the ways 6. As has been said, the rack is located centrally between the ways and consequently the lugs are arranged so as to permit the pinion 11, to occupy a central position between the ways. A gear 14 is rigidly mounted on the shaft 12 and meshes with a gear 15, located above the rack and forming a part of the transmission mechanism of the tool-stock or turret 5. The outer end of the rack 7 is unsupported but the guides 10 on the turret are so located that they are capable of preventing objectionable vibrations no matter where the turret is located along its ways 6.

The inverted rack simplifies the construction of the lathe since there is no necessity for providing a sheath or cover plates for the rack to protect it from the metal filings and chips which may fall from the tool carried by the turret. By so disposing the rack that its upper or exposed face is smooth, and the teeth are located on its lower face there is no tendency for the transmission mechanism to be damaged by metal chips or filings since they cannot come into contact with the teeth of the rack and there is no tendency for them to lodge on the rack and interfere with the transmission mechanism.

The location and arrangement of the pinion 11 and the other gears forming a part of the transmission mechanism, is advantageous since the turret forms a protecting cover for them and since they are so located that chips of metal could not possibly reach them. Besides preventing metal chips and filings from lodging on the rack, the rounded or cylindrical surface of the rack is advantageous, because it increases the bearing face between the rack and the turret and therefore decreases the friction and the resistance to motion of the turret.

By locating the rack centrally between the ways 6 and by locating the rack-engaging pinion immediately below it and centrally with relation to the body of the turret the strains imposed on the turret by the transmission mechanism are central and there are no cross bending strains in the shafts of the transmission mechanism, in the rack 7, or in the turret 5, and the power necessary to actuate the turret, is less than it would be with any other arrangement of the rack.

In accordance with the requirements of the patent statutes we have herein illustrated the present preferred form of our invention, its functions and principles of operation, but we desire it to be understood that various changes substitutions and modifications may be made without departing from the spirit and scope of our invention as set forth in the appended claims.

What we claim is:

1. In a machine of the character described, a tool-stock, a bed having ways along which the tool-stock is adapted to move, a rack secured to the frame, at one end only, and projecting along said ways, bearings mounted on the tool-stock, for supporting the free end of the rack, and a pinion for engaging the rack mounted on the tool-stock, immediately adjacent to one of said bearings.

2. In a machine of the character described, a tool-stock, a bed having ways along which the tool-stock is movable, and a head-stock mounted on the bed, an inverted rack secured to the bed at the head stock end only, and projecting between and parallel to said ways, three bearings for the rack, spaced relatively great distances apart and mounted on the tool-stock, a pinion, for engaging the rack, mounted on the tool-stock between two of said bearings, and means mounted on the tool-stock for driving the pinion.

RICHARD K. LE BLOND.
WILLIAM F. GROENE.

Witnesses:
WALTER F. MURRAY,
FRED LE BLOND.